(12) United States Patent
Hirakata

(10) Patent No.: US 6,786,606 B2
(45) Date of Patent: *Sep. 7, 2004

(54) PROJECTION-TYPE DISPLAY DEVICE

(75) Inventor: Yoshiharu Hirakata, Kanagawa (JP)

(73) Assignee: Semiconductor Energy Laboratory Co., Ltd. (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/928,066

(22) Filed: Aug. 10, 2001

(65) Prior Publication Data

US 2002/0027641 A1 Mar. 7, 2002

Related U.S. Application Data

(63) Continuation of application No. 09/569,727, filed on May 10, 2000, now Pat. No. 6,305,806, which is a continuation of application No. 09/159,831, filed on Sep. 24, 1998, now Pat. No. 6,109,753.

(30) Foreign Application Priority Data

Sep. 29, 1997 (JP) .............................................. 9-282561

(51) Int. Cl.⁷ .............................................. G03B 21/00
(52) U.S. Cl. ...................................................... 353/122
(58) Field of Search ........................... 353/74, 75, 122, 353/77, 97; 359/443, 450, 460

(56) References Cited

U.S. PATENT DOCUMENTS

| | | | |
|---|---|---|---|
| 4,083,626 A | 4/1978 | Miyahara et al. | 350/117 |
| 4,705,357 A | 11/1987 | Dietch | 350/322 |
| 5,796,499 A | 8/1998 | Wenyon | 359/15 |
| 5,875,013 A | 2/1999 | Hiroshi | 349/110 |
| 6,109,753 A | 8/2000 | Hirakata | 353/122 |
| 6,305,806 B1 * | 10/2001 | Hirakata | 353/122 |

* cited by examiner

*Primary Examiner*—William Dowling
(74) *Attorney, Agent, or Firm*—Cook, Alex, McFarron, Manzo, Cummings & Mehler, Ltd.

(57) ABSTRACT

A rear-type projection display device is provided, in which even a liquid crystal panel having several point defects is used, the point defects are hardly recognized. According to the present invention, in order not to display the display defects (the bright spots or unlit defects) that take place when a light from a light source transmits a liquid crystal panel having the point defects, means for correcting the display defects is provided on the liquid crystal panel side of a screen.

99 Claims, 3 Drawing Sheets

PROJECTION-TYPE DISPLAY DEVICE

This application is a continuation of U.S. application Ser. No. 09/569,727, filed on May 10, 2000, now U.S. Pat. No. 6,305,806, which is a continuation of U.S. application Ser. No. 09/159,831, filed on Sep. 24, 1998, now U.S. Pat. No. 6,109,753 issued Aug. 29, 2000.

BACKGROUND OF THE INVENTION

1. Field of the Invention

The present invention relates to a picture display device that utilizes so-called electrooptical materials or electrooptical elements, such as liquid crystal, optical characteristics of which are subject to modulation by voltage, current, frequency or other electrical factors, and more particularly to a projection-type display device in which a display device provided with electrical elements such as transistors for controlling pixels for every pixel is used.

2. Description of the Related Art

As a projection system for projection-type display devices, there has been known a method called a rear projection system. In the rear projection system, an image is formed on the surface of a transmission type diffusion screen (hereinafter it is sometimes referred to as simply a screen) through a light source, enabling the image to be observed from the screen surface side opposite to the light source. A conventional device is shown in FIG. 5A. In FIG. 5A, reference numeral 500 denotes a main body; 501, a light source; 502, a liquid crystal panel and optical system; 503 and 504, mirrors; and 505, a screen.

Such display device of projection type (hereinafter it is sometimes referred to as a rear projection-type display device) irradiates a small-sized liquid crystal panel of 3 inch or less with an intense light from the light source to display an enlarged image on the screen by utilizing the optical system. For that reason, in order to make the display screen high in fineness and density, it is necessary further to narrow intervals between pixels of the liquid crystal panel or to reduce the size of the pixels and wirings themselves.

As indicated above, the development of highly fine liquid crystal panels is keenly attempted to obtain the display screen with high fineness and high density.

However, when the number of dot of the liquid crystal panel (the number of pixel) is increased to make the screen high in fineness, the line defect, point defect or the like tend to take place causing low yield. The term "point defect" means one pixel or an aggregate of more pixels which are malfunctioned by some reasons. Bright spots in which a white dot is displayed at the time of displaying black and unlit defects in which a black dot is displayed at the time of displaying white are main display malfunctions caused by the point defect.

That is especially the case with the projection-type display device in which the small-sized liquid crystal panel is irradiated with an intense light and an enlarged image is displayed on the screen using the optical system. Accordingly, upon use of the liquid crystal panel having at least one point defect, the bright spot 508 is displayed when displaying black, as shown in FIG. 5B, and the unlit defect 509 is also displayed when displaying white, as shown in FIG. 5C which make the display malfunctions prominent.

There is known a method in which the liquid crystal panel is processed with a laser beam to repair the panel, or the like. As means for repairing such point defects, however, the liquid crystal panel of the projection type is difficult to be thus processed minutely because the pixel pitch or the like is very small. Accordingly, the repair thereof is seems to become difficult when the fineness of the panel is further enhanced.

SUMMARY OF THE INVENTION

In view of the foregoing problems, an object of the present invention is to provide a rear projection-type display device with that the point defect is hardly recognized in the eyes of an observer and good display quality is obtained even when a liquid crystal panel having several point defects is used.

In an arrangement of the present invention disclosed in this specification, a projection-type display device is comprised of: a light source; an electrooptical element that modulates a light from the light source; a screen; optical means for projecting the light modulated by the electrooptical element on the screen; and correction means for correcting the display malfunction on the screen due to the point defect of the electrooptical element.

In the above arrangement, the correction means is one selected from light-shielding means, light scattering means, light reflecting means, light collecting means and light absorbing means, or the combination thereof.

In the above arrangement, the correction means is provided adjacent to the rear surface side of the screen.

In the above arrangement, the correction means is provided on the rear surface of the screen.

In the above arrangement, the correction means is means formed by processing the screen to reduce an amount of transmitted light through the screen In the above arrangement, the means for collecting the light is a protrusion in the shape of cone, elliptical hemisphere or planoconvex, and has function of a lens.

In the present invention, the screen is composed of a light transmitting plate that is mainly formed of a transparent material and on the rear surface side of the screen, as shown in FIG. 1, the correction means for correcting the display malfunction is provided.

Note that the term "screen" appeared in this specification means a surface on which an observer can confirm the display quality (displaying plane), and a back-side surface thereof is called the rear surface of the screen.

BRIEF DESCRIPTION OF THE DRAWINGS

The present invention is more readily understood by means of accompanying drawings, in which.

DETAILED DESCRIPTION OF THE PREFERRED EMBODIMENT

Hereinbelow, descriptions will successively be made of embodiments according to the present invention with reference to the drawings.

[Embodiment 1]

Figure 1:
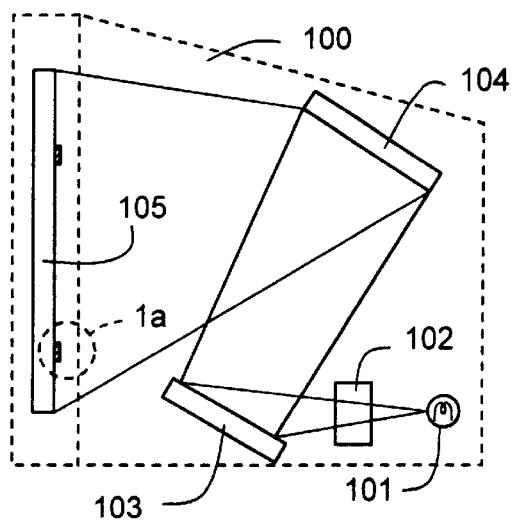
FIG. 1 is a block diagram showing a first embodiment of the present invention.

FIG. 1 is a block diagram showing an embodiment of the present invention.

Figure 4:
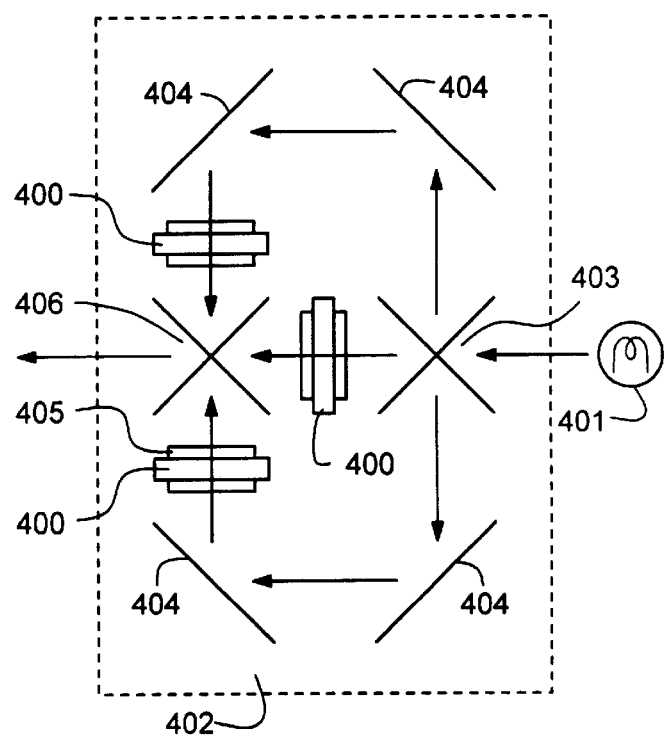
FIG. 4 is a schematic view of a liquid crystal panel and optical system.
Figure 5A:
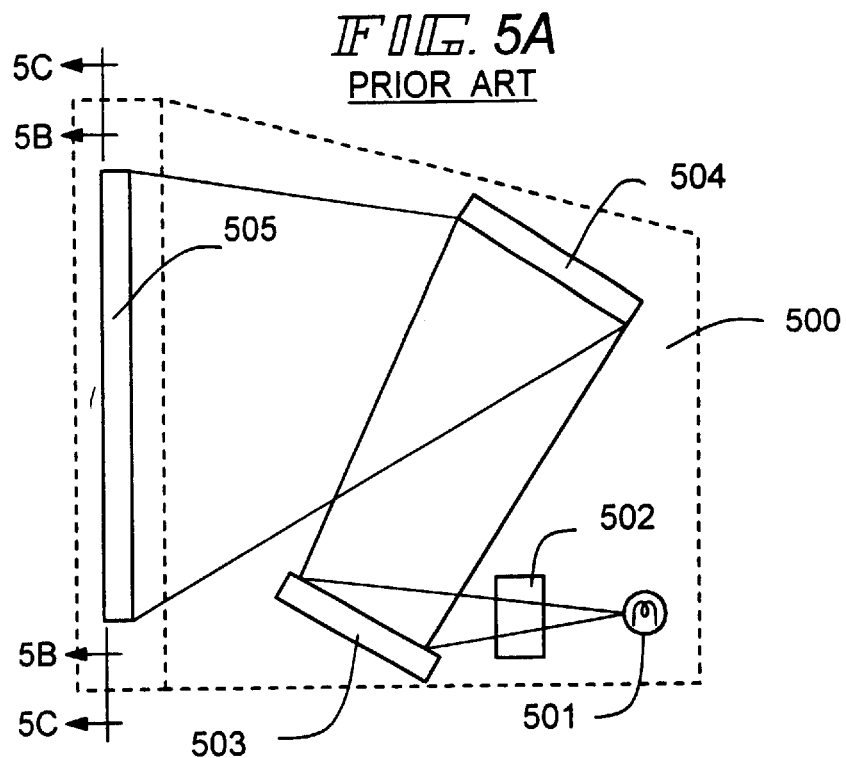
FIGS. 5A to 5C are views showing an example of a conventional device.
Figure 5B:
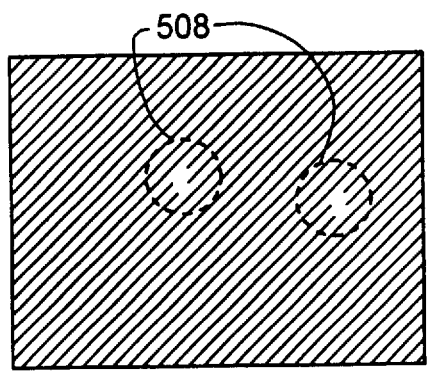
Figure 5C:
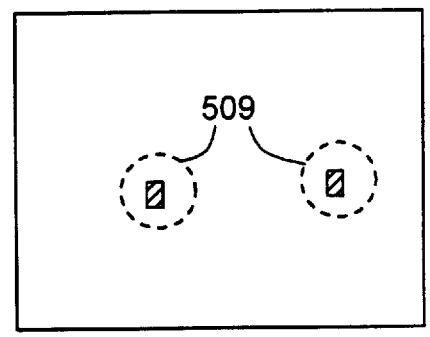

In FIG. 1, a light source 101 employs a metal halide lamp. The light source 101 is, however, not particularly limited to the metal halide lamp as long as it is a white light lamp. A liquid crystal panel and optical system 102 shown in FIG. 1 is comprised of, as shown in FIG. 4 as an example, a cross dichroic prism 403 for separating a light from the light source 401 into three colored lights different from each other (red, blue, green) to outgo the same, a polarized beam splitter 406 for respectively converging the lights separated into three colors, a total internal reflection mirror 404, a polarizing plate 405 and three liquid crystal panels 400. What denoted by reference numeral 102 in FIG. 1 correspond to the 402 in FIG. 4. The liquid crystal panel and optical system 102 is not limited particularly as long as it is a liquid crystal panel and optical system of rear projection type. Also, though not shown in the figures, as the other optical system such an arrangement may be employed in which a light collecting lens is disposed between the light source and the liquid crystal panel, or a projecting lens or the like is disposed between the liquid crystal panel and a screen 105.

The lights of three colors from the cross dichroic prism 403 are respectively irradiated onto different liquid crystal panels from each other to synthesize each image obtained on the respective liquid crystal panels by the polarized beam splitter 406. Thereafter, each one is irradiated while being enlarged on the screen so that an image is obtained. The color display is thus attained without provision of a color filter.

The screen 105 is mainly formed of a light transmitting plate made of a transparent material. In the rear surface thereof, a light-shielding object 106 is provided as shown in FIG. 1.

When black display is conducted on the screen so that bright spots are developed, the location where the light-shielding object is to be provided is a portion where the bright spots present. The light-shielding object 106 is provided in order to prevent the light that passes through the point defect of the liquid crystal panel from traveling in a direction in which an observer gazes at the screen.

In this embodiment, a colored film, for instance, a black film or blue film is employed as the light-shielding object. This light-shielding object 106 is not limited particularly as far as it is a material that reduces the amount of transmitted light through the screen.

Accordingly, the light-shielding object may he made up of a film that reflects a light completely. For example, a metal material that reflects a light completely may be used. Alternatively, a colored layer may be provided by applying a solution containing a pigment only to the portion at which bright spots are developed.

Figure 3A:
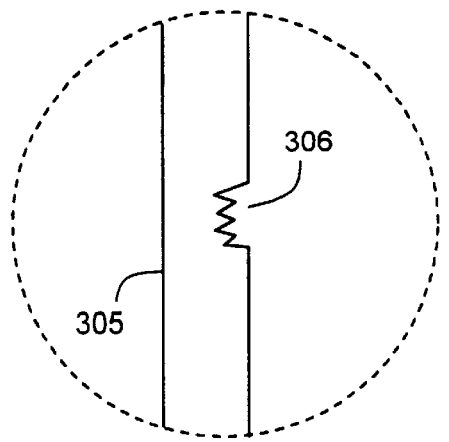
FIGS. 3A to 3C are enlarged views showing correction means in accordance with the present invention.
Figure 3B:
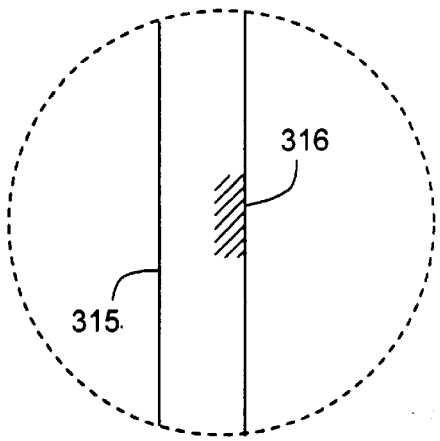

As shown in FIG. 3A, an arrangement in which a concave 306 is formed on a screen 305 itself may be also employed to scatter the light. And also, as shown in FIG. 3B, an arrangement in which a portion 316 is provided, which is obtained by transforming or discoloring a screen 315 itself for the purpose of reducing the amount of transmitted light may be employed.

When white display is conducted on the screen so that the unlit defects are developed, though not shown in the figures, a light collecting object is provided on the rear surface of the screen in a similar manner as in the case of the black display. The portion where the light collecting object is provided is a portion in which the unlit defects are developed. The light collecting object collects the light to shade the unlit defects.

Figure 3C:
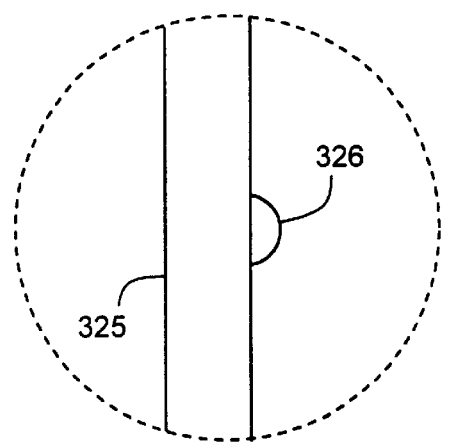

In this embodiment, a lens with a shape of elliptical hemisphere as shown in FIG. 3C is used as the light collecting object. The light collecting object may have a shape of cone or planoconvex. The light collecting object is not limited particularly as far as it is a material that collects the light of the screen.

In this embodiment, mirrors 103 and 104 are provided so that the lights emitted from the liquid crystal panel are reflected to enter to the screen. The mirrors refract an optical path from the liquid crystal panel to the screen, which shortens the depth of the whole device, thereby capable of downsizing the same.

In this embodiment, the display defects (the bright spots or unlit defects) caused by portions of the point defects of the liquid crystal panel were hardly recognized and an excellent image was obtained.

That correction method is preferable to be applied to all of the point defects of the liquid crystal panel. Also, the method can be applied only to the point defects of green, which are readily recognized. As a result, a high improving effect can be obtained.

[Embodiment 2]

A light-shielding object or a light collecting object is provided directly on a screen in Embodiment 1. In the present embodiment, a substrate having a transparency or a filter having a transparency is arranged in contact with the screen. The light-shielding object or the light collecting object is provided via the substrate or the filter above.

Figure 2:
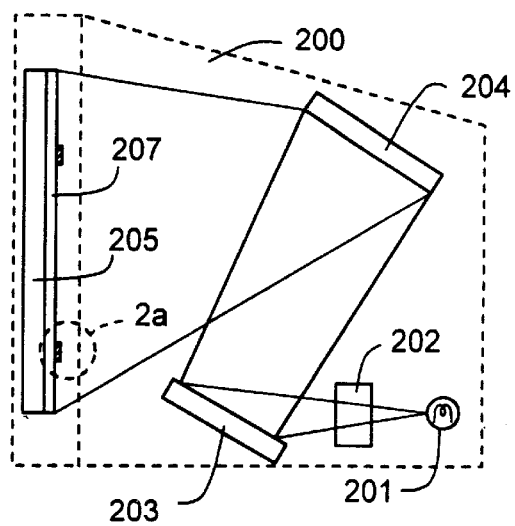
FIG. 2 is a block diagram showing a second embodiment of the present invention.
Figure 1A:
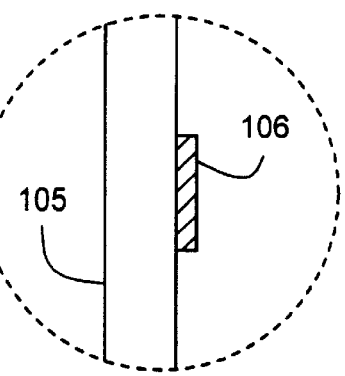
Figure 2A:
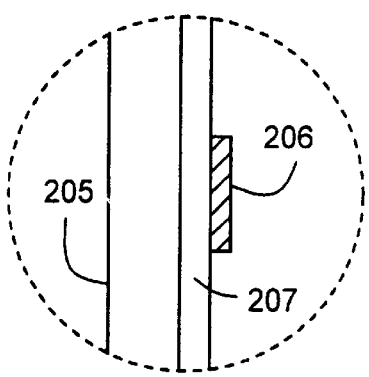

In FIG. 2, a xenon lamp is employed as a light source 201. A liquid crystal panel and optical system 202 similar to the ones used in Embodiment 1 is used. That is, the liquid crystal panel and optical system 202 in FIG. 2 corresponds to the 402 in FIG. 4. As the optical system, though not shown, an arrangement in which a light collecting lens is provided between the light source and the liquid crystal panel, or an arrangement in which a projecting lens is provided between the liquid crystal panel and a screen 205 may be employed. In this embodiment, the liquid crystal panel and the optical system 202 is, similarly to Embodiment 1, not particularly limited as long as it is a rear projection-type liquid crystal panel and optical system.

The screen 205 is mainly formed of a light transmitting plate made of a transparent material. The rear surface thereof is provided with a substrate having a transparency in contact with the screen or a filter having a transparency in contact with the screen, which is denoted by reference numeral 207 in FIG. 2, and on which the light-shielding object or the light collecting object is disposed.

With the above arrangement, may be The light-shielding object or the light collecting object is readily formed through the aid of the substrate or filter 207. Also, if the liquid crystal panel is broken from some reason, the device may be repaired at low price by replacing the substrate or filter 207 on which a light-shielding object 206 or the light collecting object is provided as well as replacing the liquid crystal panel.

Similarly to Embodiment 1, the display defects (the bright spots or unlit defects) due to portions of the point defects of the liquid crystal panel were hardly recognized and an excellent image could be obtained also in this embodiment.

[Embodiment 3]

In the present embodiment, a halogen lamp is employed as a light source. The light source is not limited particularly as long as it is a white lamp. One liquid crystal panel with a color filter is utilized to constitute a transmission-type liquid crystal display device. Also, though not shown in the figure, an arrangement for an optical system may be such that a light collecting lens is provided between the light source and the liquid crystal panel, or that a projecting lens is disposed in the front surface of the liquid crystal panel.

As in Embodiment 1 or 2, in order not to display the display defects (the bright spots or unlit defects) due to portions of the point defects which take place when the light from the light source is transmitted through a liquid crystal panel having the point defects, correction means for correcting the display defects by the point defects is provided on the screen, or on the filter disposed in contact with the screen or the rear surface side of the substrate provided in contact with the screen.

Similarly to Embodiments 1 and 2, the display defects (the bright spots or unlit defects) due to portions of the point defects of the liquid crystal panel were hardly recognized and an excellent image could be obtained in this embodiment, too.

[Embodiment 4]

It is needless to say that the present invention is not limited to the projection-type display devices that are shown in Embodiments 1 to 3. Application range of the present invention is quite so wide that it is applicable to every projection-type display device. For example, the present invention can be applied to a projection-type display device in which liquid crystal display elements, EL (electro luminescence) elements, EC (electro chrominance) elements, PDP elements and other spontaneous luminescent elements are used. In particular, the present invention is extremely effective when applied to a device that employs a minute small-sized liquid crystal panel which is difficult to fabricate and low in the yield.

According to the present invention, in order not to display the display defects (the bright spots or unlit defects) that take place when the light from the light source transmits the liquid crystal panel having the point defects, means for correcting the display defect is provided adjacent to the rear surface side or on the rear surface of the screen. As a result, thus, an excellent picture is provided to an observer.

With an application of the present invention, the liquid crystal panel having the point defects which has been not allowed to be used in the rear projection-type display device can be sufficiently used as a good article, whereby the yield can be improved.

What is claimed is:

1. A projection-type display device comprising:
   a screen, said screen enabling an image to be observed from a screen surface side;
   at least an electro luminescence element; and
   a light shielding object preventing a point defect of the an electro luminescence element from being observed on the screen when a black image is displayed on the screen.

2. A projection-type display device according to claim 1, wherein the light shielding object includes a light reflecting film.

3. A projection-type display device according to claim 1, wherein the light shielding object comprises a metal material.

4. A projection-type display device according to claim 1, wherein a transparent object is provided over a rear surface of the screen.

5. A projection-type display device according to claim 4, wherein the transparent object comprises one selected from the group consisting of a transparent substrate and a transparent filter.

6. A projection-type display device according to claim 1, wherein the screen comprises a light transmitting plate.

7. A projection-type display device according to claim 1, wherein the screen surface side is opposite to said electro luminescence element.

8. A projection-type display device according to claim 1, wherein the light shielding object includes a colored film.

9. A projection-type display device according to claim 8, wherein the colored film comprises a pigment.

10. A projection-type display device according to claim 8, wherein said colored film reduces an amount of transmitted light of said screen.

11. A projection-type display device according to claim 1, wherein light shielding object is provided over the rear surface side of said screen.

12. A projection-type display device according to claim 1, further comprising an optical system for projecting the image to be observed onto the screen.

13. A projection-type display device according to claim 1, wherein said optical system includes at least a cross dichroic prism.

14. A projection-type display device according to claim 1, wherein said projection type display device is a rear projection type display device.

15. A projection-type display device according to claim 1, wherein a transparent object is in contact with a rear surface of the screen.

16. A projection-type display device comprising:
    a screen, said screen enabling an image to be observed from a screen surface side;
    at least an electro luminescence element; and
    a light collecting object preventing a point defect of the electro luminescence element from being observed on the screen when a white image is displayed on the screen.

17. A projection-type display device according to claim 16, wherein the light collecting object has a lens with a shape of a cone.

18. A projection-type display device according to claim 16, wherein the light collecting object has a lens with a shape of a planoconvex.

19. A projection-type display device according to claim 16, wherein the light collecting object has a lens with a shape of an elliptical hemisphere.

20. A projection-type display device according to claim 16, wherein a transparent object is provided over a rear surface of the screen.

21. A projection-type display device according to claim 16, further comprising an optical system for projecting the image to be observed onto the screen.

22. A projection-type display device according to claim 16, wherein the screen surface side is opposite to said electro luminescence element.

23. A projection-type display device according to claim 16, wherein the light collecting object has a lens.

24. A projection-type display device according to claim 20, wherein the transparent object comprises one selected from the group consisting of a transparent substrate and a transparent filter.

25. A projection-type display device according to claim 16, wherein said projection type display device is a rear projection type display device.

26. A projection-type display device according to claim 16, wherein said light collecting object is provided over the rear surface side of said screen.

27. A projection-type display device according to claim 16, wherein the screen comprises a light transmitting plate.

28. A projection-type display device according to claim 21, wherein said optical system includes at least a cross dichroic prism.

29. A projection-type display device according to claim 16, wherein a transparent object is in contact with a rear surface of the screen.

30. A projection-type display device comprising:
an electro luminescence element;
a screen for displaying an image of said electro luminescence element; and
means for correcting a display malfunction on the screen caused by a point defect of said electro luminescence element, said means provided over a portion of the screen.

31. A projection-type display device according to claim 30, wherein said means is a light shielding object.

32. A projection-type display device according to claim 30, wherein said means is a light scattering object.

33. A projection-type display device according to claim 30, wherein said means is a light reflecting object.

34. A projection-type display device according to claim 30, wherein said means is a light collecting object.

35. A projection-type display device according to claim 30, wherein said means is a light absorbing object.

36. A projection-type display device according to claim 35, wherein said light absorbing object reduces an amount of transmitted light of said screen.

37. A projection-type display device according to claim 30, wherein the screen comprises a light transmitting plate.

38. A projection-type display device according to claim 30, wherein a transparent object is in contact with a rear surface of the screen.

39. A projection-type display device according to claim 30, wherein the transparent object comprises one selected from the group consisting of a transparent substrate and a transparent filter.

40. A projection-type display device according to claim 30, wherein the screen surface side is opposite to said electro luminescence element.

41. A projection-type display device according to claim 33, wherein the light reflecting object includes a metal material.

42. A projection-type display device according to claim 34, wherein the light collecting object comprises a lens with a shape of elliptical hemisphere, cone, or planoconvex.

43. A projection-type display device according to claim 34, wherein the light collecting object comprises a lens.

44. A projection-type display device according to claim 35, wherein the light absorbing object comprises a colored film.

45. A projection-type display device according to claim 44, wherein the colored film comprises a pigment.

46. A projection-type display device according to claim 30, further comprising an optical system for projecting the image to be observed onto the screen.

47. A projection-type display device according to claim 46, wherein said optical system comprises a cross dichroic prism.

48. A projection-type display device according to claim 30, wherein said projection type display device is a rear projection type display device.

49. A projection-type display device according to claim 30, wherein a transparent object is provided over a rear surface of the screen.

50. A projection-type display device comprising:
a screen, said screen enabling an image to be observed from a screen surface side;
at least a PDP element; and
a light shielding object preventing a point defect of the PDP element from being observed on the screen when a black image is displayed on the screen.

51. A projection-type display device according to claim 50, wherein the light shielding object comprises a light reflecting film.

52. A projection-type display device according to claim 50, wherein the light shielding object comprises a metal material.

53. A projection-type display device according to claim 50, wherein a transparent object is in contact with a rear surface of the screen.

54. A projection-type display device according to claim 53, wherein the transparent object comprises one selected from the group consisting of a transparent substrate and a transparent filter.

55. A projection-type display device according to claim 50, wherein the screen comprises a light transmitting plate.

56. A projection-type display device according to claim 50, wherein the screen surface side is opposite to said PDP element.

57. A projection-type display device according to claim 50, wherein the light shielding object comprises a colored film.

58. A projection-type display device according to claim 57, wherein the colored film comprises a pigment.

59. A projection-type display device according to claim 50, wherein said light shielding object is provided over a rear surface side of said screen.

60. A projection-type display device according to claim 50, further comprising an optical system for projecting the image to be observed onto the screen.

61. A projection-type display device according to claim 60, wherein said optical system includes at least a cross dichroic prism.

62. A projection-type display device according to claim 50, wherein said projection-type display device is a rear projection type display device.

63. A projection-type display device according to claim 50, wherein said colored film reduces an amount of transmitted light of said screen.

64. A projection-type display device according to claim 50, wherein a transparent object is provided over a rear surface of the screen.

65. A projection-type display device comprising:
a screen, said screen enabling an image to be observed from a screen surface side;
at least a PDP element; and
a light collecting object preventing a point defect of the PDP element from being observed on the screen when a white image is displayed on the screen.

66. A projection-type display device according to claim 65, wherein the light collecting object comprises a lens with a shape of a cone.

67. A projection-type display device according to claim 65, wherein the light collecting object comprises a lens with a shape of a planoconvex.

68. A projection-type display device according to claim 65, wherein the light collecting object comprises a lens with a shape of an elliptical hemisphere.

69. A projection-type display device according to claim 65, wherein a transparent object is provided over a rear surface of the screen.

70. A projection-type display device according to claim 65, further comprising an optical system for projecting the image to be observed onto the screen.

71. A projection-type display device according to claim 65, wherein the screen surface side is opposite to said PDP element.

72. A projection-type display device according to claim 65, wherein the light collecting object comprises a lens.

73. A projection-type display device according to claim 69, wherein the transparent object comprises one selected from the group consisting of transparent substrate and a transparent filter.

74. A projection-type display device according to claim 65, wherein said projection-type display device is a rear projection type display device.

75. A projection-type display device according to claim 65, wherein the screen comprises a light transmitting plate.

76. A projection-type display device according to claim 70, wherein said optical system includes at least a cross dichroic prism.

77. A projection-type display device according to claim 65, wherein said light collecting object is provided over the rear surface of said screen.

78. A projection-type display device according to claim 65, wherein a transparent object is in contact with a rear surface of the screen.

79. A projection-type display device comprising:
   a PDP element;
   a screen for displaying an image of said PDP element; and
   means for correcting a display malfunction on the screen caused by a point defect of said PDP element, said means provided over a portion of the screen.

80. A projection-type display device according to claim 79, wherein said means is a light shielding object.

81. A projection-type display device according to claim 79, wherein said means is a light scattering object.

82. A projection-type display device according to claim 79, wherein said means is a light reflecting object.

83. A projection-type display device according to claim 79, wherein said means is a light collecting object.

84. A projection-type display device according to claim 79, wherein said means is a light absorbing object.

85. A projection-type display device according to claim 84, wherein said light absorbing object reduces an amount of transmitted light of said screen.

86. A projection-type display device according to claim 79, wherein the screen comprises a light transmitting plate.

87. A projection-type display device according to claim 79, wherein a transparent object is in contact with a rear surface of the screen.

88. A projection-type display device according to claim 79, wherein the transparent object comprises one selected from the group consisting of a transparent substrate and a transparent filter.

89. A projection-type display device according to claim 79, wherein the screen surface side is opposite to said PDP element.

90. A projection-type display device according to claim 82, wherein the light reflecting object includes a metal material.

91. A projection-type display device according to claim 93, wherein the light collecting object comprises a lens with a shape of elliptical hemisphere, cone, or planoconvex.

92. A projection-type display device according to claim 83, wherein the light collecting object comprises a lens.

93. A projection-type display device according to claim 84, wherein the light absorbing object comprises a colored film.

94. A projection-type display device according to claim 93, wherein the colored film comprises a pigment.

95. A projection-type display device according to claim 79, further comprising an optical system for projecting the image to be observed onto the screen.

96. A projection-type display device according to claim 95, wherein said optical system comprises a cross dichroic prism.

97. A projection-type display device according to claim 79, wherein said projection type display device is a rear projection type display device.

98. A projection-type display device according to claim 79, wherein said means is provided over the rear surface side of the screen.

99. A projection-type display device according to claim 89, wherein a transparent object is provided over a rear surface of the screen.

* * * * *